United States Patent
Schoor et al.

(10) Patent No.: US 9,664,788 B2
(45) Date of Patent: May 30, 2017

(54) METHOD FOR EVALUATING OBSTACLES IN A DRIVER ASSISTANCE SYSTEM FOR MOTOR VEHICLES

(71) Applicant: Robert Bosch GmbH, Stuttgart (DE)

(72) Inventors: Michael Schoor, Stuttgart (DE); Goetz Kuehnle, Hemmingen (DE); Volker Gross, Ditzingen (DE); Benedikt Loesch, Stuttgart (DE); Stefan Heilmann, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 14/286,209

(22) Filed: May 23, 2014

(65) Prior Publication Data
US 2014/0347208 A1    Nov. 27, 2014

(30) Foreign Application Priority Data

May 24, 2013    (DE) .................... 10 2013 209 736

(51) Int. Cl.
*G01S 13/93* (2006.01)
*G01S 7/35* (2006.01)
(Continued)

(52) U.S. Cl.
CPC ............ *G01S 13/931* (2013.01); *G01S 7/354* (2013.01); *G01S 7/41* (2013.01); *G01S 13/42* (2013.01); *G01S 13/34* (2013.01)

(58) Field of Classification Search
CPC ........ G01S 13/931; G01S 13/42; G01S 7/354; G01S 7/41; G01S 13/34
(Continued)

(56) References Cited

U.S. PATENT DOCUMENTS 5,268,692 A * 12/1993 Grosch ................. G01S 13/345
                                                    342/129
5,646,613 A *  7/1997 Cho ........................ B60R 19/38
                                                    180/167
(Continued)

FOREIGN PATENT DOCUMENTS

DE        199 45 250           4/2001
DE        10349210 A1          5/2005
(Continued)

OTHER PUBLICATIONS

A. G. Stove, "A software simulator for automotive radar," Computer Modelling and Simulation of Radar Systems, IEE Colloquium on, London, 1993, pp. 11/1-11/4.*

*Primary Examiner* — John B Sotomayor
(74) *Attorney, Agent, or Firm* — Norton Rose Fulbright US LLP; Gerard Messina (57) ABSTRACT

A method for evaluating obstacles based on locating data of a radar sensor in a driver assistance system for motor vehicles, in which at least one evaluation function is calculated which indicates, as a function of a set of measured variables which are related to a potential obstacle, whether the potential obstacle is to be evaluated as a real obstacle, a complexity indicator being formed based on the locating data which indicates the complexity of a present measurement situation, and at least two different evaluation functions being defined for the same set of measured variables, and it being decided which of the evaluation functions is applied in the present measurement situation as a function of the complexity indicator.

12 Claims, 5 Drawing Sheets

(51) Int. Cl.
*G01S 7/41* (2006.01)
*G01S 13/42* (2006.01)
*G01S 13/34* (2006.01)

(58) Field of Classification Search
USPC .... 342/133, 70–72, 194; 340/435, 436, 903; 701/301
See application file for complete search history.

(56) References Cited

U.S. PATENT DOCUMENTS

| | | | | |
|---|---|---|---|---|
| 8,918,209 B2* | 12/2014 | Rosenstein | ............ | B25J 11/009 700/245 |
| 2008/0224837 A1* | 9/2008 | Meyer | .................... | B60Q 9/005 340/435 |
| 2008/0266167 A1* | 10/2008 | Baumann | ................ | G01S 13/87 342/52 |
| 2008/0272898 A1* | 11/2008 | Irion | ...................... | B60Q 9/008 340/436 |
| 2009/0192686 A1* | 7/2009 | Niehsen | ................ | B60W 30/17 701/70 |
| 2010/0052884 A1* | 3/2010 | Zeppelin | ............... | B60W 30/16 340/435 |
| 2010/0066587 A1* | 3/2010 | Yamauchi | ............ | G05D 1/0044 342/70 |
| 2010/0085238 A1* | 4/2010 | Muller-Frahm | ........ | G01S 11/12 342/70 |
| 2010/0286874 A1* | 11/2010 | Schwindt | ............... | B62D 15/029 701/45 |
| 2011/0025548 A1* | 2/2011 | Nickolaou | ............. | G01S 13/72 342/52 |
| 2011/0172849 A1* | 7/2011 | Rotaru | .................. | H04L 12/417 701/1 |
| 2012/0130628 A1* | 5/2012 | Dintzer | ................... | G01S 13/52 701/301 |
| 2013/0009760 A1* | 1/2013 | Washlow | ................ | G01S 7/003 340/425.5 |
| 2014/0333468 A1* | 11/2014 | Zhu | ........................ | G01S 17/95 342/54 |

FOREIGN PATENT DOCUMENTS

| | | | | |
|---|---|---|---|---|
| DE | 102013209736 A1 * | 11/2014 | ............ | G01S 7/354 |
| WO | 2005109036 A1 | 11/2005 | | |

* cited by examiner

METHOD FOR EVALUATING OBSTACLES IN A DRIVER ASSISTANCE SYSTEM FOR MOTOR VEHICLES

RELATED APPLICATION INFORMATION

The present application claims priority to and the benefit of German patent application no. 10 2013 209 736.0, which was filed in Germany on May 24, 2013, the disclosure of which is incorporated herein by reference.

FIELD OF THE INVENTION

The present invention relates to a method for evaluating obstacles based on locating data of a radar sensor in a driver assistance system for motor vehicles, in which at least one evaluation function is calculated which indicates, as a function of a set of measured variables which are related to a potential obstacle, whether the potential obstacle is to be evaluated as a real obstacle.

BACKGROUND INFORMATION

In driver assistance systems, for example in collision warning systems, a radar sensor is frequently used for locating objects in the surroundings, in particular ahead of the host vehicle, the sensor, for example, being capable of measuring distances and relative speeds of the located objects according to the FMCW (frequency-modulated continuous wave) principle. Preceding vehicles which have an absolute speed which is comparable to the speed of the host vehicle and therefore do not constitute a relevant obstacle are identifiable in that the relative speed measured by the radar sensor is significantly smaller than the speed of the host vehicle in terms of absolute value. If, on the other hand, the measured relative speed of an object is negative (approach) and is equal to the speed of the host vehicle in terms of absolute value, the object is then a stationary object which constitutes a potential obstacle. Based on a certain angle resolution capability, the radar sensor is also capable of determining whether the object is situated on the roadway or on the edge of the roadway. However, even if a stationary object has been located on the roadway, it does not necessarily constitute a real obstacle. For example, even relatively small objects such as cans lying on the roadway or manhole covers set into the pavement cause a radar echo which is difficult to distinguish from the radar echo of a more extensive object constituting a real obstacle.

Nevertheless, in order to make it possible to distinguish between real obstacles and apparent obstacles, one or multiple evaluation functions are used in known driver assistance systems, whose arguments are formed by measured variables which typically have values for real obstacles which are different from those for apparent obstacles.

One example of such a measured variable is, for example, the signal strength of a single located object. The underlying thought is that an extensive object which is more likely to be evaluated as a real obstacle will generally generate a stronger radar echo than an object which is limited in size, such as a small object lying on the roadway, which can be driven over without a problem. Depending on the signal strength of the object, the evaluation function may then assume either the value 1, which means that the object is considered to be a real obstacle, or the value 0, which means that the object is evaluated as an apparent obstacle. However, according to the specific embodiment, the evaluation function may also assume intermediate values between 0 and 1, which indicate varying probabilities that the object is a real obstacle. Ultimately, in order to come to an unambiguous decision, multiple evaluation functions which are based on different criteria are generally linked.

Other examples of measured variables which provide information about the relevance of an object as an obstacle are the elevation angle at which the object is viewed by the radar sensor and changes of this elevation angle over time. A real obstacle will generally be situated at least at the same height as the radar sensor, so that the elevation angle is zero or positive, while a small object lying on the road will generally have a negative elevation angle, which in addition grows more negative with increasing proximity to the object. On the other hand, in the case of a relatively extensive real obstacle, it will frequently happen that the radar echo is received from various elevation angles due to multipath scattering over the road surface. In addition, pitching and steering movements of the host vehicle result in the signal being received from various reflection targets which also have various elevation angles. A sharply fluctuating elevation angle therefore tends to indicate a real obstacle.

Even if multiple criteria, i.e., multiple evaluation functions, are combined, it will not be possible in practice to correctly evaluate all objects which appear. The evaluation functions must therefore be defined in such a way that a reasonable compromise is found between a high hit rate, i.e., a high proportion of real obstacles which are also actually identified as obstacles, and a low false alarm rate, i.e., which may be a low proportion of apparent objects incorrectly evaluated as real obstacles. For this purpose, parameters which determine the characteristics of the evaluation function must be suitably chosen. In the simplest case, the evaluation function is a threshold value function which jumps from 0 to 1 if a certain threshold value is exceeded. In this case, the threshold value constitutes a parameter which must be suitably chosen. In more complex evaluation functions, the parameters may be sets of multiple threshold values or polynomial coefficients or the like.

When establishing these parameters, the avoidance of false alarms will generally have the highest priority, since frequent false alarms may significantly reduce the acceptance of the system and may even constitute a potential hazard in driver assistance systems which actively intervene into the braking system of the vehicle when there is an acute risk of collision. If, however, in order to avoid such false alarms, the parameters are chosen too "conservatively," a larger proportion of real obstacles will then unavoidably not be identified, thus reducing the usefulness of the system.

SUMMARY OF THE INVENTION

An object of the present invention is to provide a method having a low frequency of false alarms which enables an increase of the usefulness of the driver assistance system.

This object may be achieved according to the present invention by forming a complexity indicator based on the locating data which indicates the complexity of a present measurement situation, and by defining at least two different evaluation functions for the same set of measured variables, and deciding which of these evaluation functions is applied in the present measurement situation as a function of the complexity indicator.

The present invention is based on the thought that the totality of the signals which a radar sensor receives at a given point in time may differ considerably in their complexity from situation to situation. In the simplest cases, only a single radar echo is received from an approximately point-shaped object, the signal is not very noisy and corresponds to sharply defined values not only for the distance and the relative speed, but also for the azimuth angle and the elevation angle. In this case, a relatively reliable differentiation between real obstacles and apparent obstacles is possible, so that the risk of false alarms is low and it would be reasonable to parameterize the evaluation functions with regard to what may be a high usefulness. On the other hand, in more complex situations, for example, if multiple objects are located simultaneously whose radar echoes partially overlap or interfere with each other, the probability of error during the evaluation is significantly higher, so that it would be reasonable to configure the parameters in view of the avoidance of false alarms and in return accepting greater losses in usefulness. According to the present invention, the parameterization is now not determined invariably for all measurement situations in question, but is varied as a function of the situation, specifically as a function of the complexity. It is thus possible to achieve a higher usefulness at least in situations having low complexity, thereby also statistically improving the overall usefulness when averaging over a plurality of variously complex situations.

Advantageous embodiments and refinements of the present invention are provided in the further descriptions herein.

Exemplary embodiments are described in greater detail below based on the drawings.

DETAILED DESCRIPTION

Figure 1:
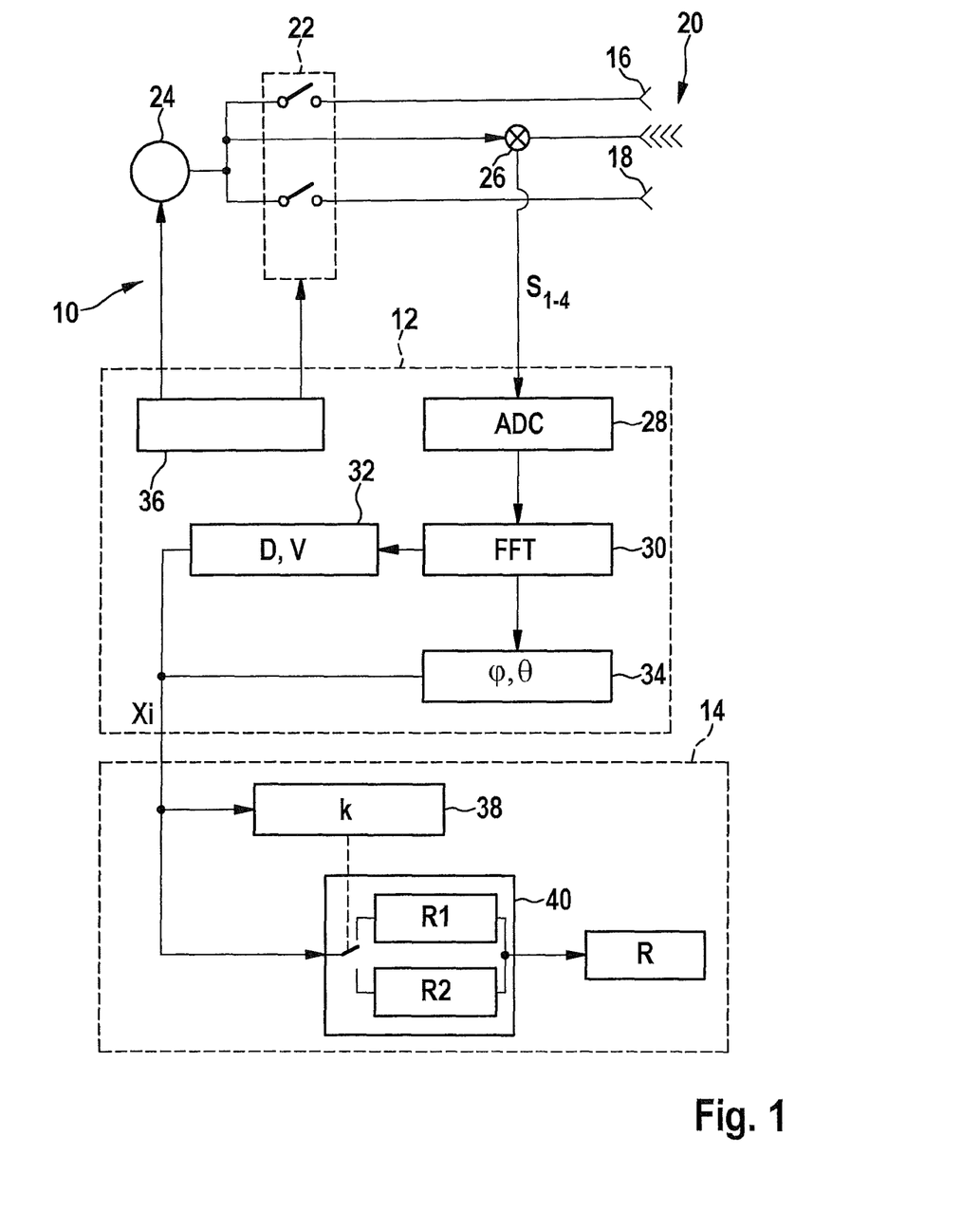
FIG. 1 shows a block diagram of a driver assistance system, in which the method according to the present invention is implemented.

The driver assistance system depicted as a block diagram in FIG. 1 is, for example, a collision warning system. Essential components of this system are a radar sensor 10 (FMCW radar), a preprocessing stage 12, and an evaluation module 14. In preprocessing stage 12, the signals provided by radar sensor 10 are evaluated, and a number of measured variables Xi are formed which characterize a present measurement situation of radar sensor 10. Measured variables Xi typically also include locating data of one or multiple objects which have been presently located by radar sensor 10.

In evaluation module 14, measured variables Xi are further evaluated in order to evaluate the located objects (at least the stationary objects) with respect to their relevance as an obstacle, so that it may be decided whether or not a given object constitutes a real obstacle.

Additional components of the collision warning system, which are not shown here, are then used to calculate the probability of collision based on the locating data for the obstacles which are evaluated as real and based on the dynamic data of the host vehicle, and possibly to issue an audible or haptic collision warning to the driver and/or to actively intervene into the braking system of the vehicle and to trigger emergency braking.

In the example shown, radar sensor 10 has two transmitting antennas 16, 18 and four receiving antennas 20. The receiving antennas are situated at certain distances on a horizontal line, so that by comparing the amplitudes and phases of the signals received by the various antennas, the azimuth angle of a located radar target may be determined. Transmitting antennas 16, 18 have an elevation dependence and are connected to a local oscillator 24 via a switching network 22, so that by switching between transmitting antennas 16 and 18 and comparing the signals received for the various switching states, the elevation angle of the located object may also be at least roughly determined. Transmitting and receiving antennas 16, 18, 20 may be situated approximately in the focal plane of a beam-shaping radar lens, so that a certain directional selectivity is achieved via the more or less large displacement of the antennas relative to the optical axis of the radar lens. However, specific embodiments are also conceivable in which the transmitting and receiving antennas are configured as planar array antennas. Likewise, specific embodiments having monostatic antenna designs are also conceivable.

According to the functional principle of an FMCW radar, the frequency of the high-frequency signal provided by local oscillator 24 is modulated in a ramp shape. The radar echoes received by the four receiving antennas 20 are mixed in mixers 26 with the transmitting signal provided by oscillator 24 in four parallel channels, so that four intermediate-frequency signals $S_{1-4}$ are obtained whose frequency is equal to the difference between the frequency of the received radar echo and the frequency of the radar signal transmitted at the point in time of reception. The frequency of the intermediate-frequency signal is thus on the one hand a function of the signal propagation time from the transmitting antenna and back to the receiving antennas and a function of the rise of the modulation ramp, and on the other hand is also a function of the relative speed of the located object due to the Doppler effect.

Due to the differing path lengths from the object to the individual receiving antennas 20 and possibly the directional selectivity of the receiving antennas, the intermediate-frequency signals received in the four channels also have characteristic differences in their (complex) amplitude which are a function of the azimuth angle of the object.

In preprocessing stage 12, intermediate-frequency signals $S_{1-4}$ are initially digitized in an analog/digital converter stage 28 and are each recorded per channel over the duration of one frequency modulation ramp. The time signals thus obtained are then converted in a transformation stage 30 into corresponding spectra via fast Fourier transformation. In each of these spectra, a located object stands out in the shape of a peak at a frequency which is a function of the distance and the relative speed of this object. From the frequencies of two peaks which belong to the same object but which were obtained on frequency ramps having different slopes, for example, a rising ramp and a falling ramp, distance D and relative speed V of the object are then determined in a downstream evaluation module 32.

However, if more than two objects are located simultaneously, a certain ambiguity remains, since it is not necessarily clear which peak belongs to which object. Nevertheless, this ambiguity may be eliminated by considering at least one additional spectrum which has been obtained on an additional modulation ramp having a different ramp slope. The frequency position of each individual peak indicates a linear relationship between the distance and the relative speed of the relevant object. This relationship may be represented in a D-V space as a straight line. Families of straight lines are thus obtained for the multiple peaks in the multiple spectra, the at least three straight lines which belong to the same object, however, originating from different modulation ramps all intersecting at one point, which then indicates the true distance and the true relative speed of this object.

In an angle estimation module 34, the amplitudes (absolute values and phases) of the intermediate-frequency signals received in the four channels are compared per object (i.e., separately for each peak) in order to determine the azimuth angles φ of the located objects.

In addition, a control module 36 is integrated into preprocessing stage 12, which on the one hand controls oscillator 24 and determines the frequency modulation, and on the other hand controls switching network 22 in order to switch between transmitting antennas 16 and 18. For example, a frequency modulation ramp is transmitted by transmitting antenna 16, and the same ramp is subsequently transmitted once again by transmitting antenna 18. In angle estimation module 34, the amplitudes obtained in this way are also compared in order to determine elevation angle θ of the objects.

Variables D, V, φ, θ obtained in this way for each located object form a portion of measured variables Xi. In addition, in preprocessing stage 12, several additional measured variables are formed which characterize the located objects and the overall measurement situation in greater detail. Examples of such measured variables will be described in greater detail below.

Evaluation module 14 contains a complexity module 38, in which at least one complexity indicator k based on measured variables Xi is formed which characterizes the complexity of the present measurement situation.

In addition, evaluation module 14 contains a function block 40 in which at least two evaluation functions R1, R2 are stored, both of which are functions of the same selection of measured variables Xi and provide different values for the relevance R of an object as an obstacle. Complexity indicator k determines which of the two functions R1, R2 is applied to the measured variables, as represented in FIG. 1 by a switch which switches between functions R1 and R2. If the complexity is low, function R1 is selected. On the other hand, if the complexity is higher, function R2 is selected. These functions are defined in such a way that, if the values of measured variables Xi are statistically distributed, function R1 produces the result that the obstacle is relevant (real) more frequently than function R2.

Figure 2:
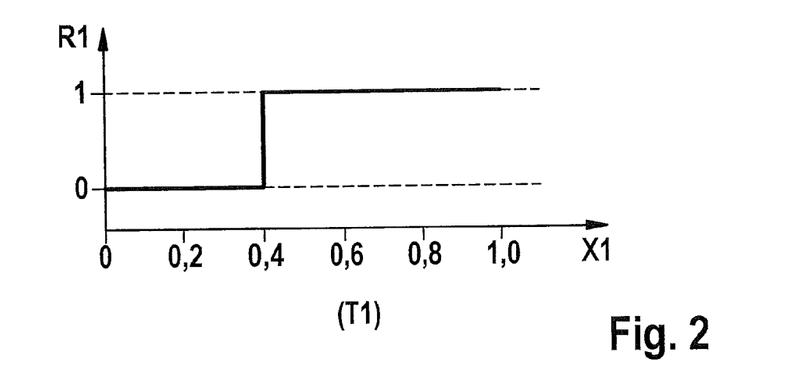
FIGS. 2 and 3 show examples of different parameterizations of one evaluation function.
Figure 3:
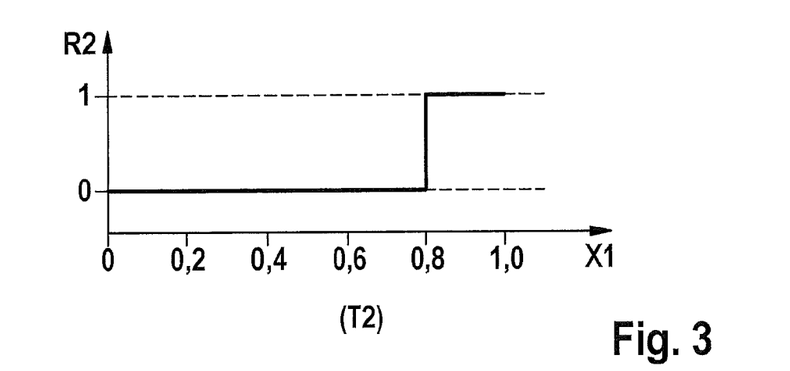

FIGS. 2 and 3 show two simple examples of evaluation functions R1 and R2. These two evaluation functions belong to a common class in the sense that they are functions of the same independent variables. Here, this independent variable is, for example, a measured variable X1, which is a measure of the total power received from a located object. This measured variable may be calculated in preprocessing stage 12, for example, in the manner described below.

Figure 8:
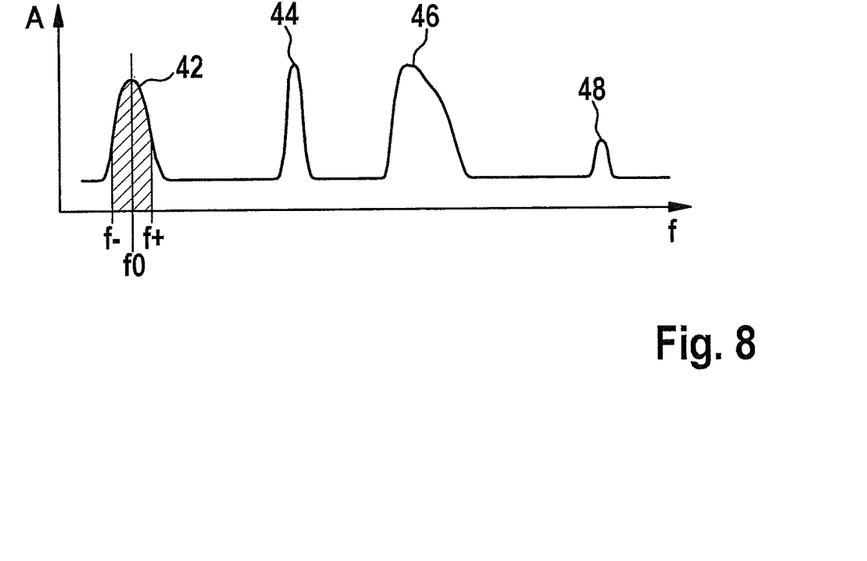
FIG. 8 shows an example of a spectrum of an intermediate-frequency signal in an FMCW radar.

FIG. 8 shows an example of a spectrum recorded on a modulation ramp, i.e., a function which indicates (complex) amplitude A (only the absolute value of the amplitude is shown here) as a function of frequency f. The spectrum contains multiple peaks 42, 44, 46, 48, from which it may be assumed that they each belong to one located object. Peak 42 will be taken as an example here. The total power received by the corresponding object is then the integral of the square of amplitude $A^2$ over the peak. For example, frequencies f− and f+ may be taken as integration limits at which amplitude A has decreased to half the peak value (at f0). Measured variable X1 then corresponds to the shaded area depicted in FIG. 8.

Since the received power is inversely proportional to the fourth power $D^4$ of the object, it will generally be advantageous to standardize measured variable X1 to a standard distance by multiplying the value of the integral by a factor which is proportional to the fourth power $D^4$ of the distance D measured for this object.

A stationary object which represents a real obstacle, for example a vehicle standing on the roadway, will result in a relatively pronounced peak, so that measured variable X1 is correspondingly large. On the other hand, a non-relevant apparent obstacle, such as a manhole cover in the roadway, will merely result in a weakly formed peak, such as, for example, peak 48 in FIG. 8, having a correspondingly low value of measured variable X1. One decision criterion for whether the object is a real obstacle may therefore be to check whether the total power for this object lies above or below a certain threshold value.

Correspondingly, evaluation function R1 in FIG. 2 is a step-shaped function which has the value 0 for low values of X1 and jumps to the value 1 at a threshold value T1=0.4. Function value R1=1 thus means that the associated object is considered to be a real obstacle.

Evaluation function R2 shown in FIG. 3 differs from evaluation function R1 only in that a different threshold value T2=0.8 is used.

If evaluation function R1 is used on measured variable X1, a relatively large proportion of the total number of located stationary objects will be evaluated as a real obstacle from a statistical point of view, i.e., all objects for which measured variable X1 is at least 0.4. However, this implies the risk that false alarms will occur frequently, because an object which is actually irrelevant will also be incorrectly evaluated as a real obstacle.

On the other hand, if evaluation function R2 is applied, this risk is lower, since only the objects for which X1 is at least 0.8 are evaluated as real obstacles. However, in this case, there is also an increased risk that even real obstacles are not evaluated as real (R2=1), because their total power still lies below 0.8. In this case, a collision warning which is actually appropriate would not be issued to the driver, thus degrading the usefulness of the system.

Figure 4:
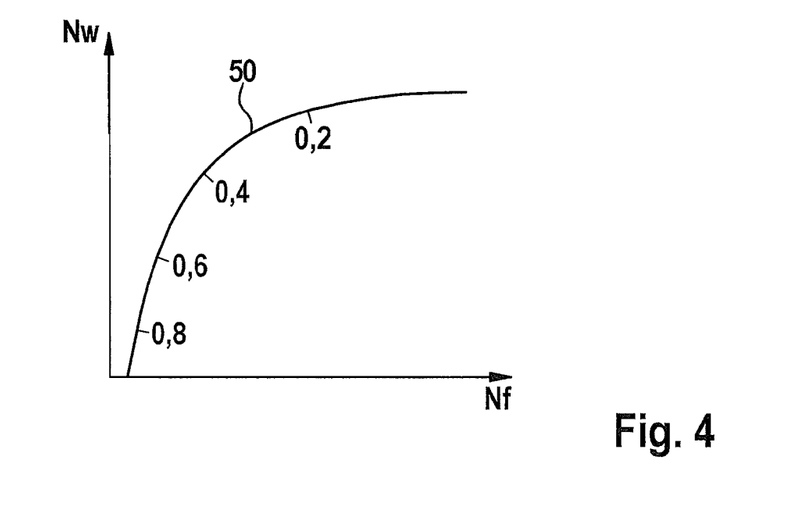
FIG. 4 shows an ROC (receiver operating characteristic) diagram for the evaluation functions according to FIGS. 2 and 3.

FIG. 4 shows a so-called ROC (receiver operating characteristic) curve 50 for one class of functions which are functions of the same independent variables and have the same function specification, only with different parameters (in this example, threshold values T1, T2). This curve establishes a relationship between the relative frequency Nf of the false alarms and the relative frequency Nw of the correct hits, i.e., the number of cases in which an object is correctly identified as a real obstacle, for different values of the parameter. This curve may be empirically determined for a given radar sensor and a given class of evaluation functions R1, R2 by calculating the evaluation functions for a plurality of measurement situations which cover the total bandwidth of the measurement situations occurring in daily traffic, and having a frequency distribution which may be similar to reality. For example, for this purpose, test runs may be carried out in which the vehicle travels for a certain period of time on a freeway, a certain period of time on a country highway, a certain period of time in city traffic, occasionally in a tunnel as well, etc., the lengths of the corresponding periods of time behaving approximately as in a typical "life story" of a motor vehicle. Depending on the choice of the parameter, here, of threshold value T1 or T2, a different value pair (Nf, Nw) is thus obtained. In FIG. 4, the parameters (the threshold values 0.8, 0.6, . . . ) are indicated along the curve. The higher the threshold value is, the smaller is frequency Nf of the false alarms. However, frequency Nw of the real hits is also smaller. Frequency Nf of the false alarms increases with decreasing threshold values, while frequency Nw of the real hits approaches the maximum value of 100%.

If the ROC curve for a given class of evaluation functions is recorded for the totality of all measurement situations in question, the only leeway that still remains in the design of the system is to choose a reasonable value for the determinative parameter of the function class, i.e., in this example, for the threshold value, it being necessary to find a compromise between the goals of "Nf being as small as possible" and "Nw being as large as possible."

Figure 5:
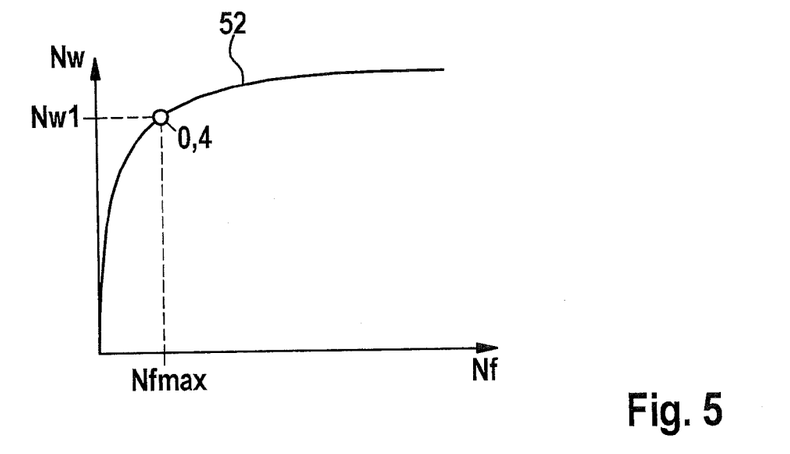
FIGS. 5 and 6 show ROC diagrams for measurement situations having varying complexity.
Figure 6:
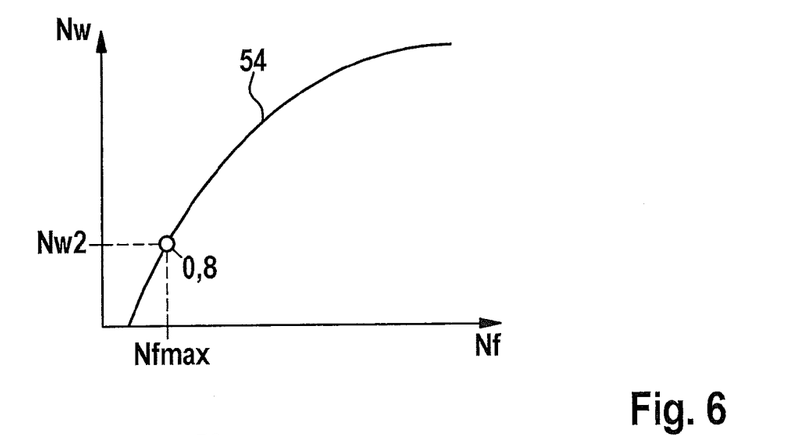

FIGS. 5 and 6 show examples of ROC curves 52, 54 which were recorded for different selections of measurement situations. In FIG. 5, only measurement situations were taken into consideration in which the surrounding traffic is relatively well organized and clearly structured, i.e., the number of simultaneously located objects is low and the signals received from each object are not very noisy and are relatively unambiguous, so that an unambiguous determination of the corresponding locating data (distance, relative speed, azimuth angle, elevation angle) having relatively narrow error tolerances is possible. In this case, number Nf of false alarms is low, even if comparatively low threshold values are chosen, so that a relatively large frequency Nw1 of correct hits and thus a correspondingly higher usefulness is achieved for a frequency Nfmax of false alarms which is still regarded as acceptable.

On the other hand, in FIG. 6, only measurement situations were taken into consideration in which the surrounding traffic was relatively confusing (many objects located simultaneously, signals very noisy and interfered with). In these situations, the error frequency is naturally greater, so that ROC curve 54 is flatter, and at threshold value 0.8, which provides the same frequency Nfmax of false alarms, a considerably lower frequency Nw2 of real hits is obtained.

The fundamental idea of the present invention is now that a distinction is also made between measurement situations having lower complexity and those having higher complexity in the actual use of the driver assistance system, and depending on the complexity, different threshold values, or in the general case, different sets of determinative parameters are chosen for the evaluation functions.

Figure 7:
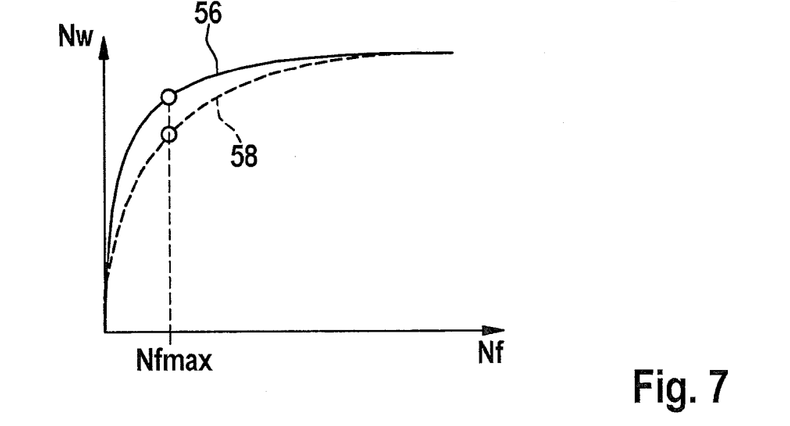
FIG. 7 shows a comparison of ROC diagrams for situation-independent and situation-dependent parameterizations of one evaluation function.

FIG. 7 shows an ROC curve 56 which is obtained if a differentiation is made in the selection of the threshold value between different levels of complexity by, for example, selecting the low threshold value 0.4 for the measurement situations which were taken into consideration in FIG. 5, and on the other hand, selecting the higher threshold value 0.8 for the measurement situations which were taken into consideration in FIG. 6. For comparison, FIG. 7 also shows an ROC curve 58 for the case in which no differentiation is made between the levels of complexity and a selection is made of a uniform threshold value for all measurement situations which produces the same relative frequency Nfmax of false alarms averaged over all measurement situations. It is apparent that in this case, only a lower relative frequency of correct hits is obtained, and the usefulness of the system is thus increased by the present invention (ROC curve 56).

In practice, in most cases, not only a single class of evaluation functions is used for the evaluation of the stationary objects, but rather multiple classes which are functions of different sets of independent variables, and the results of the individual evaluation functions are then logically or arithmetically linked.

For example, a class of evaluation functions may be defined in which the set of independent variables includes only one single measured variable X2 which indicates the elevation angle measured for the relevant object. Similarly to FIGS. 2 and 3, the evaluation functions may be a threshold value comparison, each having different threshold values. Objects whose elevation angle is positive or only slightly negative are thus evaluated as real obstacles, while objects whose elevation angle is negative and large in terms of absolute value are qualified as apparent obstacles, since these objects do not project high above the roadway surface and therefore may be driven over by the host vehicle.

Additional examples of evaluation functions would be functions which evaluate changes over time, for example, fluctuations, of the elevation angle, and/or certain tendencies in the change of the elevation angle as a function of time or the object distance.

In all these cases, the evaluation functions may also be multi-valued functions which vary not only between 0 and 1, but may also assume intermediate values. When working with multiple classes, the final decision as to whether the object is relevant or not may then be made based on a weighted sum or based on any other function of the results of the individual evaluation functions. The individual evaluation functions may, for example, be multi-valued functions having multiple stages and correspondingly multiple threshold values as parameters. In another specific embodiment, the evaluation functions may also be continuous functions of one or multiple measured variables, for example, polynomials, the polynomial coefficients then being parameters which differentiate the individual evaluation functions of the same class from each other and are varied as a function of the complexity. Generally, the parameters are selected as a function of the complexity in such a way that from a statistical point of view, the number of cases in which an object is evaluated as a real obstacle is greater at low complexity than at high complexity.

Several examples for suitable definitions of complexity indicators will be presented below. A distinction may generally be drawn between global complexity indicators, which relate to the measurement situation as a whole, and local complexity indicators, which relate to a single located object or a group of located objects.

One example of a global complexity indicator is the total number of located objects at the given point in time. For example, in the spectrum shown in FIG. 8, four peaks 42, 44, 46, 48 are identifiable, so that the total number of located objects would be four. Since, in practice, multiple modulation ramps are run through in each measurement cycle, multiple spectra are obtained in each cycle, in which the number of located objects may be different due to disturbances. It is therefore advantageous to add the peaks of all spectra recorded in one measurement cycle and to standardize them in proportion to a maximum value which is set sufficiently high, so that a complexity indicator k is obtained which varies between 0 and 1.

Figure 9:
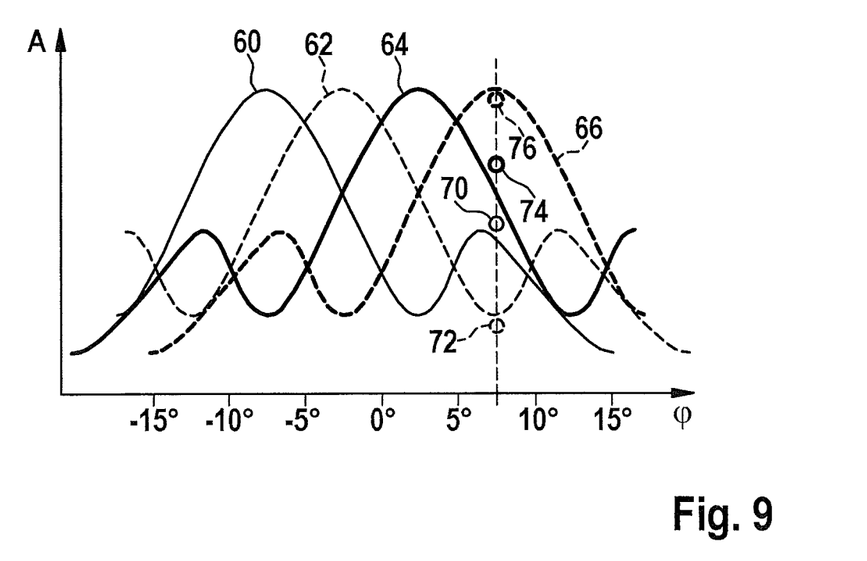
FIG. 9 shows a diagram for explaining the angle measurement in an angle-resolving radar sensor.

Another example of a global complexity indicator is the angle quality averaged over all located objects. In this context, the principle of the estimation of the azimuth angle is illustrated in FIG. 9. Four curves 60, 62, 64, 66 are shown, one for each of the four receiving antennas 20, which indicate the dependence of amplitude A (again, only the absolute value of the amplitude is shown; however, a phase-based angle estimation method is also possible) on the azimuth angle, for a standard object which is located using a standard signal strength at an azimuth angle φ. Because of the differing directional selectivity of the receiving antennas, each of the curves has its maximum at a different azimuth angle. The amplitudes measured in the four reception channels for a given object (frequency at the crest of the peak) are represented in FIG. 9 by circles 70, 72, 74, 76, circle 70 belonging to the same reception channel as curve 60, circle 72 to the same channel as curve 62, etc. Circles 70 through 76 are depicted on a vertical straight line at the angle position at which the best match exists between the measured amplitudes (represented by the circles) and the amplitudes to be expected based on curves 60 through 66. In the example shown, the best match exists at azimuth angle φ=7.5°, which therefore constitutes the estimated angle value for the relevant object. However, due to unavoidable disturbances, the match between the measured values and the theoretical values is not exact. The deviation between the measured values and the values indicated by the curves (for example, the mean quadratic deviation) is a measure of the angle quality, i.e., the quality of the angle measurement. The higher the angle quality is for a given object, the more reliable is the angle estimation. At the same time, however, the angle quality is also a measure of how noisy or interfered with the radar echo from the relevant object is.

If the angle qualities are now averaged over all located objects, a global indicator is obtained, which may be regarded as a measure of the general quality and reliability of the locating data at the given point in time.

It is advantageous to form a global complexity indicator which is a weighted sum of a complexity indicator $k_a$, which is a function of the number of objects, and a complexity indicator $k_w$, which is a function of the global angle quality:

$$k = a \cdot k_a + b \cdot k_w$$

where $k_a$ and $k_w$ may each vary within the interval [0,1] and the positive coefficients a and b are chosen in such a way that the sum also varies within the interval [0,1].

Unlike global complexity indicators, local complexity indicators relate only to a single object or a group of objects which are in close proximity. One example of a local complexity indicator is, for example, the width of the peak which is associated with the relevant object within the spectrum or of the peaks in the multiple spectra which were obtained on different ramps in the same measurement cycle. The distance between f− and f+ in FIG. 8, for example, could be taken as a measure of the width of the peak, which may be standardized to the total power of the peak. While a narrow peak indicates a low-noise object having a well-defined distance and a well-defined relative speed, a wider peak may be attributed to the signal being noisier or more interfered with, or to peaks of multiple reflection centers overlapping. A higher complexity indicator is therefore assigned to a wider peak.

Methods are also known which are specifically aimed at detecting peak overlaps in the spectrum. Examples are described in EP 2 182 380 B1. If such a peak overlap is detected for the peak which belongs to the object under consideration, a high local complexity indicator is assigned to the object.

Another example of a local complexity indicator is the peak density in the spectrum, i.e., the number of peaks which are found in a certain frequency interval in the vicinity of the peak belonging to the relevant object. In this case, a higher peak density also indicates greater complexity. A related complexity indicator is the locating density in the D-V space, for example, the number of located objects whose distance D deviates by less than, for example, 5 m from the distance measured for the object under consideration, and whose relative speed V deviates by less than, for example, 1 m/s from the relative speed of the object under consideration. Unlike the peak density discussed above, only localizations which may be unambiguously associated with a real object are taken into consideration here, i.e., localizations in which the straight lines in the D-V diagram essentially intersect at one point.

Another group of local complexity indicators relates to the quality of the angle measurement in the azimuth and/or in elevation. There is a certain correlation between peak overlaps and the quality of the angle measurement in the sense that the angle measurements are generally unusable for detected peak overlaps. The complexity indicators which relate to the angle measurement may therefore be applied only if no peak overlap has been detected.

If a high angle quality is ascertained for the relevant object when determining the azimuth angle according to the method illustrated in FIG. 9, a low complexity indicator is assigned to the object, and the complexity indicator becomes greater with increasingly poor angle quality. A complexity indicator may correspondingly be formed which is a function of the quality of the measurement of the elevation angle.

Since two ramps are used for measuring the elevation angle, in which transmission is carried out once using transmitting antenna 16 and once using transmitting antenna 18 (FIG. 1), there is also the possibility of carrying out the measurement of the azimuth angle on both ramps, so that two azimuth angle measurements are obtained for the same object, each having its own angle quality. In this case, for forming the complexity indicator, on the one hand, the two angle qualities for the azimuth may be combined, and they may additionally be combined with the quality of the measurement of the elevation angle. On the other hand, the discrepancy between the two measurements of the azimuth angle (using antenna 16 and antenna 18) may result in an additional increase of the complexity indicator.

The global and local complexity indicators may finally be combined into an overall complexity indicator, which then determines the selection of the parameters for the evaluation functions. However, it is also possible to define a separate complexity indicator for each class of evaluation functions, which is then primarily a function of the variables which also the independent variables in the evaluation functions classes.

Figure 10:
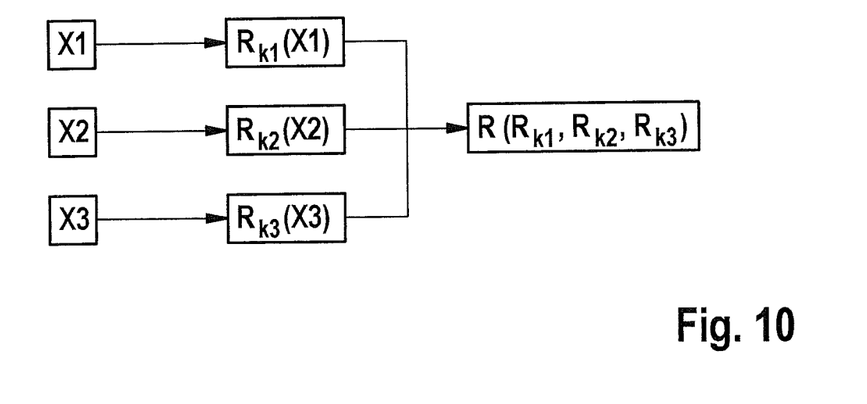
FIG. 10 shows a diagram for illustrating a procedure for obstacle evaluation with the aid of multiple evaluation functions.

In FIG. 10, three groups of evaluation functions $R_{k1}(X1)$, $R_{k2}(X2)$, and $R_{k3}(X3)$ are depicted, each of which has a different measured variable X1, X2, and X3 as an independent variable (the symbols X1, X2, and X3 may each possibly also represent a set made up of multiple measured variables). Each class of evaluation functions includes multiple functions in which the selection of the parameters differs. This selection of the parameters is a function of each of the complexity indicators k1, k2, and k3, a differently defined complexity indicator being capable of being used for each class of evaluation functions. Thus, for example, the symbol $R_{k1}$ in FIG. 10 stands for different evaluation functions which are defined for each value of the complexity indicator k1 by a different set of parameters.

In this example, three different results are therefore initially obtained which indicate, be it in the form of a yes/no statement or in the form of a probability, whether or not the relevant object is a real obstacle. In order to make a final decision, a function R ($R_{k1}$, $R_{k2}$, $R_{k3}$) is then calculated, which is a function of the values of the functions $R_{k1}(X1)$, $R_{k2}(X2)$, and $R_{k3}(X3)$ and has either the value 1 (relevant obstacle) or the value 0 (not a relevant obstacle).

Figure 11:
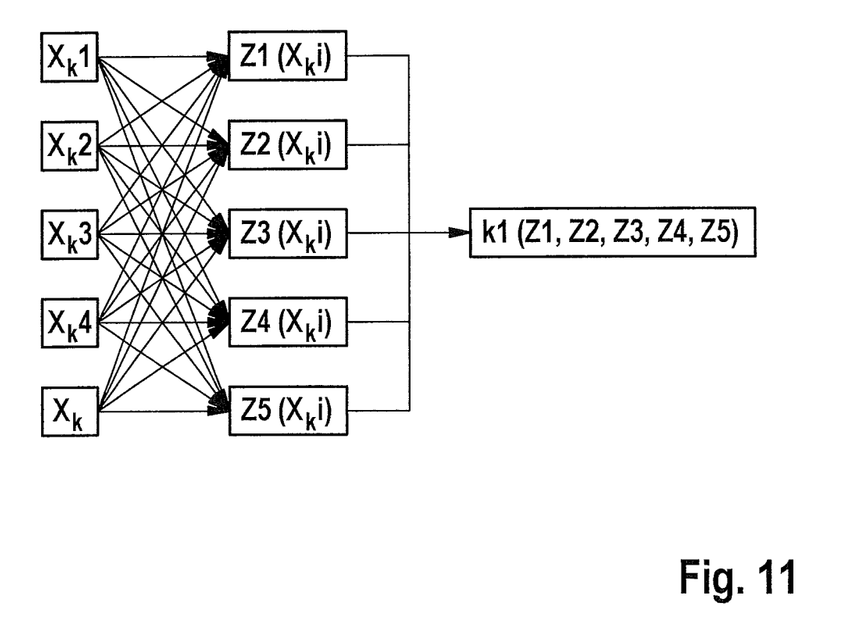
FIG. 11 shows a diagram for illustrating a procedure for generating a hierarchy of complexity indicators.

The complexity indicators may also be combined in a hierarchical structure in order to form an overall complexity indicator, be it for all evaluation functions together or only for each individual evaluation function. As an example, FIG. 11 illustrates the formation of an overall complexity indicator k1 for the evaluation functions $R_{k1}$ in FIG. 10. In this example, five intermediate indicators Z1 through Z5 are formed initially, each of which may be a function of up to five independent variables $X_{k1}$, $X_{k2}$, $X_{k3}$, $X_{k4}$, $X_{k5}$ which are derived from the locating data in each measurement cycle (here, the index k merely denotes that the relevant variables are used for calculating complexity indicators and not for calculating evaluation functions). These variables $X_{k1}$ through $X_{k5}$ may be a selection of the measured variables (Xi) which were mentioned above in connection with the various examples of complexity indicators, i.e., for example, the number of objects (for a global complexity indicator), the overall angle quality averaged over all objects, and the variables which are incorporated in the local complexity indicators, i.e., for example, the peak density, peak width, angle quality in the azimuth, angle quality in elevation, and discrepancy between the two azimuth angle measurements. Each of the intermediate indicators Z1 through Z5 is a function of at least one of these variables, but may also be a function of several of these variables. Each of the intermediate indicators Z1 through Z5 may be a weighted sum or a polynomial of variables $X_k i$ (i=1-5) and defined in such a way that each of the values of the intermediate indicator lies within the interval [0,1]. From intermediate indicators Z1-Z5 thus obtained, the final complexity indicator k1 is then formed using an additional function specification, for example, for a weighted sum or for a polynomial. Complexity indicators k2, k3 are correspondingly also formed for evaluation functions $R_{k2}$, $R_{k3}$, each having other function specifications and other selections of independent variables.

What is claimed is:

1. A method for evaluating obstacles based on locating data of a radar sensor in a driver assistance system for a motor vehicle, the method comprising:
   determining, by a system, having a processor, of the driver assistance system, at least one evaluation function which indicates, as a function of a set of measured variables which are related to a potential obstacle, whether the potential obstacle is to be evaluated as a real obstacle;
   forming, by the system having the processor, at least one complexity indicator based on the locating data which indicates the complexity of a present measurement situation;
   defining, by the system having the processor, at least two different evaluation functions for the same set of measured variables; and
   deciding, by the system having the processor, which of the evaluation functions is applied in the present measurement situation as a function of the complexity indicator.

2. The method of claim 1, wherein multiple classes of evaluation functions are defined, from which one evaluation function is selected as a function of the value of the complexity indicator in each measurement situation, and the results of the selected evaluation functions are then combined, by the system having the processor, into an overall result.

3. The method of claim 2, wherein a particular complexity indicator is defined for each class of evaluation functions.

4. The method of claim 1, wherein multiple evaluation functions are functions of one measured variable which indicates the signal strength of the radar echo received from a located object.

5. The method of claim 1, wherein multiple evaluation functions are functions of one measured variable which indicates an elevation angle of the located object.

6. The method of claim 1, wherein multiple evaluation functions are functions of one measured variable which indicates a change in the elevation angle measured for the object.

7. The method of claim 1, further comprising:
   forming, by the system having the processor, a global complexity indicator which is a function of the number of objects located in the present measurement situation and/or is a function of the average quality of the angle measurements for all objects located in this measurement situation.

8. The method of claim 1, further comprising:
   forming, by the system having the processor, at least one local complexity indicator which relates to a single located object and is a function of an object density in the vicinity of this object.

9. The method of claim 1, wherein the radar sensor includes an FMCW radar sensor and the method further comprises:
   forming, by the system having the processor, at least one local complexity indicator which relates to a single located object and indicates whether an overlapping of radar echoes originated from different objects may be determined at the location in the frequency spectrum of the received signal associated with this object.

10. The method of claim 1, wherein the radar sensor includes an angle-resolving radar sensor, and the method further comprises:
    forming, by the system having the processor, at least one local complexity indicator which relates to a single located object and indicates the quality of an angle measurement for this object.

11. The method of claim 1, further comprising:
    forming, by the system having the processor, at least one complexity indicator which is a function of multiple intermediate indicators which, for their part, are functions in different ways of one particular selection of variables which are derived from the locating data.

12. A driver assistance system for motor vehicles, comprising:
    a system, having a processor, configured for evaluating obstacles based on locating data of a radar sensor in a driver assistance system for a motor vehicle, by performing the following:
    determining at least one evaluation function which indicates, as a function of a set of measured variables which are related to a potential obstacle, whether the potential obstacle is to be evaluated as a real obstacle;

forming at least one complexity indicator based on the locating data which indicates the complexity of a present measurement situation;

defining at least two different evaluation functions for the same set of measured variables; and deciding which of the evaluation functions is applied in the present measurement situation as a function of the complexity indicator.

\* \* \* \* \*